Figure 1:
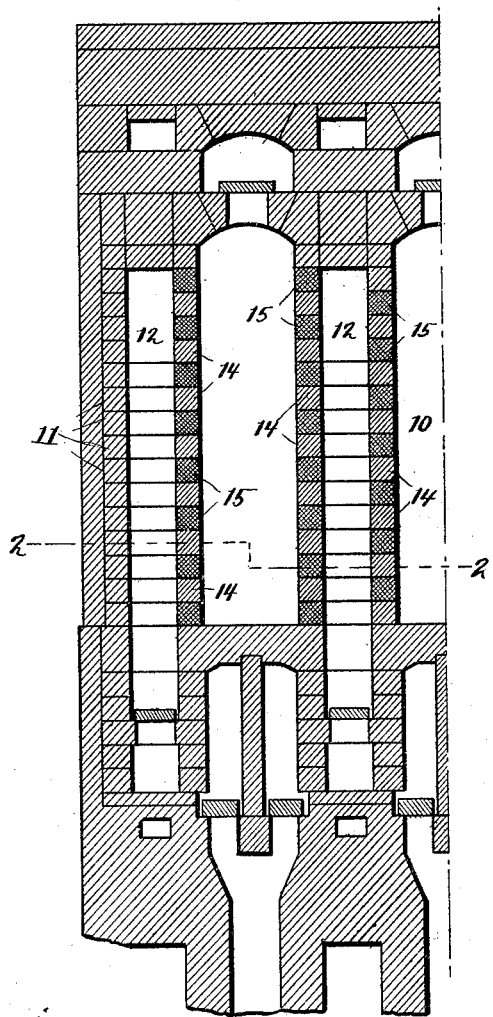

No. 682,441. Patented Sept. 10, 1901.
S. T. & C. H. WELLMAN.
COKE OVEN.
(Application filed May 22, 1901.)

(No Model.)

Witnesses.
Fred Gerlach
Tobias H. Alford

Inventors:
Samuel T. Wellman
Charles H. Wellman
By Peirce + Fisher,
their Attorneys.

UNITED STATES PATENT OFFICE.

SAMUEL T. WELLMAN AND CHARLES H. WELLMAN, OF CLEVELAND, OHIO.

COKE-OVEN.

SPECIFICATION forming part of Letters Patent No. 682,441, dated September 10, 1901.

Application filed May 22, 1901. Serial No. 61,355. (No model.)

*To all whom it may concern:*

Be it known that we, SAMUEL T. WELLMAN and CHARLES H. WELLMAN, residing at Cleveland, Cuyahoga county, Ohio, have invented certain new and useful Improvements in Coke-Ovens, of which the following is hereby declared to be a full, clear, and exact description.

The manufacture of coke in retort-ovens is carried on in a series of ovens arranged side by side, which are generally five or six feet high, about thirty feet long, and from fifteen to twenty inches in width. These ovens are separated by thick walls, through which pass horizontal or vertical flues, which are separated from the ovens by from three to four inches of brickwork. There are also generally passages or flues over and beneath the ovens. The ovens, being first heated, are filled with coal, and the heat from the brickwork drives off the volatile gases, a portion of which is burned in the flues running about the ovens, thus maintaining the heat necessary to the distillation of the gases and the coking of the coal within the retort-ovens. The walls of these ovens are made of firebrick, sometimes of brick composed principally of alumina or of silicate of alumina, and sometimes the ovens are built of pure silica bricks. As all the heat necessary to the distillation of the gases from the coal must pass through the walls of the flues into the ovens, the time necessary to the proper production of coke is dependent upon the greater or less conductivity of the brick of which the sides of the ovens are composed. The fire-bricks of alumina and silica mentioned serve well enough as fire resistants; but owing to their extreme non-conductivity the operation of producing coke takes from one to two days, according to the quality of coke desired.

Our invention is based upon the discovery that magnesite or carbonate of magnesia (calcined) made into bricks has a very much higher conductivity as a carrier of heat than either clay or silica bricks, having on an average about twice the conductivity of either of the latter. This would be a particularly desirable material from which to form the walls of retort coke-ovens; but, unfortunately, these bricks when heated to a high temperature have little strength, will not carry much weight, and under the influence of high temperature are apt to shrink considerably. Consequently if the inner walls of the ovens were formed entirely of this material the oven would soon get out of shape, the gases would leak through the walls, and in a short time the ovens would be of such shape that they could not be used at all. Owing to its high heat-conductivity our invention seeks to utilize magnesite or magnesia in a construction of the walls of the retort-ovens and at the same time to obviate the objections due to its shrinkage and inferior strength when heated. This we accomplish either by employing bricks made of magnesite or magnesia in conjunction with clay or silica bricks or by using bricks formed of a mixture of magnesite or magnesia with clay or silica.

The exact nature of the improvements will appear from the following description, and be clearly pointed out by the appended claims.

Figure 2:
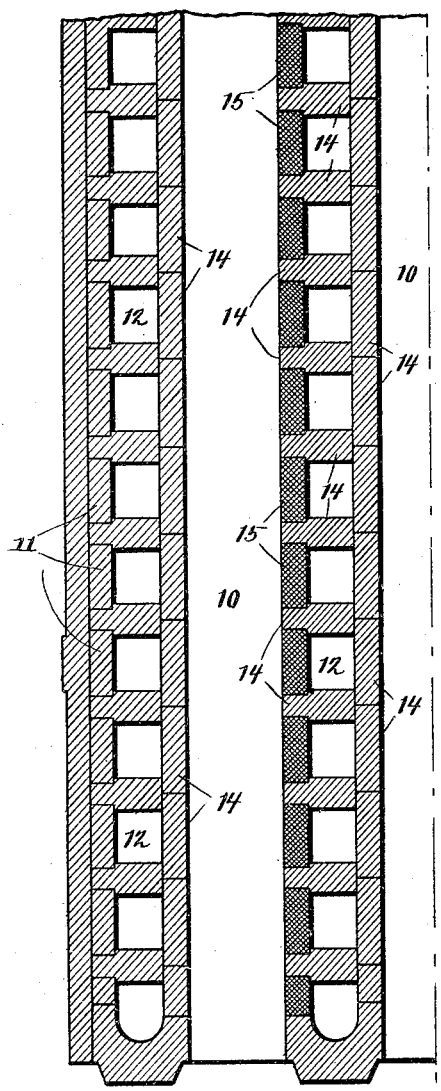

In the drawings, Figure 1 is a transverse vertical section of one form of the improved retort. Fig. 2 is a transverse horizontal section on the line *a b* of Fig. 1.

In the construction shown the outer walls of the retort-oven 10 are built of fire-brick 11, (indicated by hatch-lines,) either clay or silica, preferably the latter. The inner walls forming the sides of the retort and of the vertical flues 12, through which the gases for heating the retorts pass, are built in composite courses—that is to say, silica brick 14 and magnesite brick 15 (indicated by cross hatch-lines) are set alternately along the course with a course of silica brick 14 next above, and so on. It will be noted that the tie-courses between the side walls of the retort-ovens forming the vertical flues 12 are all of silica brick 14, the silica brick in course being projected into the inner wall to rest in the same horizontal layer alternately with the bricks of magnesia. By this arrangement the whole weight of the oven is borne by the silica bricks, and the magnesite brick do not have to bear any weight and on account of their greater conductivity perform the office of conducting the heat from the gases in the flues through the walls of the retorts in which the coal is being converted into coke.

The retort-oven made in the manner described enables the heat of the gases burning in the side flue to be imparted easily to the coking charge on account of the superior conductivity of the magnesia brick present as an integral part of the inner or retort wall. At the same time the presence of the silica fire-brick, the latter being interposed alternately with the brick of calcined magnesia in the side walls, intermediate the retorts and vertical flues, and the tie-courses between the flues being formed entirely of silica brick, constitute a skeleton structure which imparts the necessary strength and rigidity to the retorts, so that they will easily withstand the extreme heat and the burden of the brickwork itself.

The structural plan of retort shown is old and well known and need not be more fully described, and it will be understood that it may be varied without departure from the essentials of the invention.

In preparing the improved brick the crude magnesite is first calcined, then ground and sifted, after which it is tempered with water and the resultant plastic mass compressed in molds of proper shape, dried, and kiln-burned. Ordinarily a minor proportion of clay or silica can be admixed in the ground magnesite (calcined) to aid as a binder. A larger proportion of such ingredients may, if desired, be used and in a sufficient amount to render the bricks capable of withstanding considerable weight and high temperature, so that instead of making the walls of the retort-oven of alternate courses of silica and magnesite brick they may be constructed entirely of bricks formed from such a mixture. Bricks formed of a mixture of magnesite (calcined) with silica or silicate of alumina would have a greater or less conductivity, according to the proportion of magnesia which they contain, it being found in practice that pure magnesia bricks have almost twice the conductivity of similar bricks made from silica or silicate of alumina. Since such brick of mixed silica and magnesia may advantageously be used, the use of the term "magnesite" brick, occurring in the claims, is in no sense restricted to brick formed solely of that material, but should include bricks containing a greater or less amount of silica or other suitable binding and strengthening material. In lieu of magnesite it would be feasible to employ magnesia derived from dolomite or other source.

Having thus described our invention, what we claim as new, and desire to secure by Letters Patent, is—

1. A coke-oven having calcined carbonate of magnesia or magnesite bricks arranged in alternate courses in the side walls of the retort, substantially as described.

2. A coke-oven having calcined carbonate of magnesia or magnesite bricks embodied in the side walls of the retort, substantially as described.

3. Coke-ovens having the walls of the retort composed of fire-brick formed of a mixture of silica or silicate of alumina and magnesia, substantially as described.

4. In coke-ovens, the combination with the retort and the flue-passages on either side thereof, the intermediate wall being formed of fire-brick laid in alternate courses to form a skeleton structure, of the calcined carbonate of magnesia or magnesite brick interposed in the courses of said wall as a part thereof, subtantially as described.

5. In coke-ovens, the combination with the inner and outer retort-walls and with the cross-walls tied between them to form flue-passages, of the calcined carbonate of magnesia or magnesite brick interposed in the courses at the inner wall as a part thereof, substantially as described.

SAMUEL T. WELLMAN.
   CHARLES H. WELLMAN.

Witnesses:
 OLAF HANSEN,
 GEO. TOMPKINS.